United States Patent [19]

Itoh et al.

[11] Patent Number: 4,857,222

[45] Date of Patent: Aug. 15, 1989

[54] ABSORPTION TYPE REFRIGERATOR AND ABSORBING SOLUTION THEREFOR

[75] Inventors: Masahiko Itoh, Hitachioota; Heihatiro Midorikawa, Hitachi; Yasumasa Furutani, Katsuta; Michihiko Aizawa, Ushiku, all of Japan

[73] Assignee: Hitachi, Ltd., Tokyo, Japan

[21] Appl. No.: 149,476

[22] Filed: Jan. 28, 1988

[30] Foreign Application Priority Data

Jan. 30, 1987 [JP] Japan ............................ 62-18424

[51] Int. Cl.$^4$ .................................................. C09K 5/04
[52] U.S. Cl. ........................................ 252/69; 252/68; 62/112
[58] Field of Search ...................... 252/68, 69; 62/112

[56] References Cited

U.S. PATENT DOCUMENTS

| 3,968,045 | 7/1976 | Sibley | 252/68 |
| 4,311,024 | 1/1982 | Itoh et al. | 62/112 |

FOREIGN PATENT DOCUMENTS

| 11015 | 1/1980 | Japan | 252/69 |
| 224187 | 12/1983 | Japan | 252/68 |

Primary Examiner—Robert A. Wax
Attorney, Agent, or Firm—Antonelli, Terry & Wands

[57] ABSTRACT

An absorption type refrigerator has an aqueous absorbing solution. The absorbing solution comprises lithium bromide solution, 5-150 ppm by weight of $NO_3^-$ and 0.1-0.4% by weight of LiOH, and is free from any triazole compounds. The absorbing solution further includes octyl alcohol.

9 Claims, 3 Drawing Sheets

ABSORPTION TYPE REFRIGERATOR AND ABSORBING SOLUTION THEREFOR

BACKGROUND OF THE INVENTION

This invention relates to an absorption type refrigerator and, more particularly, to an absorption type refrigerator employing an excellent anti-corrosive absorbing solution, and an absorbing solution therefor.

In general, an absorption type refrigerator comprises an absorber containing therein an aqueous absorbing solution which absorbs a refrigerant to form a diluted absorbing solution and generates absorption heat which is cooled by a cooling means, a regenerator for regenerating the diluted absorbing solution by concentrating the diluted absorbing solution through evaporation of the refrigerant, a condenser for condensing the evaporated refrigerant, and an evaporator for evaporating the condensed refrigerant to cool a liquid such as water through heat exchange. In the regenerator used in such an absorption type refrigerator, as means for heating the refrigerant, there are two combustion gas heaters one of which is a type wherein a combustion gas passes among a bundle of gas heating tubes containing therein the absorbing solution and heats the absorbing solution, and other type, a steam heater wherein a steam heating pipe is disposed in the absorbing solution and heats the absorbing solution. The former type of heater is made of carbon steel in view of cost because the combustion gas has a high temperature so that the heater of gas heating tubes, made of material which is not so high in heat conductivity, such as carbon steel, can be used. The latter type of heater, that is, the steam heating pipe is made of copper or its alloy because steam temperature is not so high, so that high heat-conductivity material is needed.

In many cases, an absorption type refrigerator as mentioned above employs an aqueous lithium bromide solution as an absorbing solution. The lithium bromide solution is very corrosive to structural members of the absorption type refrigerator, particularly, to heater members such as heating tubes used in the regenerator. Therefore, many measures have been taken to prevent the structural members being corroded. A typical example of the measures is addition of $LiNO_3$ and LiOH into a lithium bromide solution. In the lithium bromide solution including $LiNO_3$ and LiOH, the concentration of $LiNO_3$ is about 350–500 ppm. This absorbing solution has a corrosion suppressing effect, but the effect is not sufficient.

U.S. Pat. No. 4,311,024 discloses a lithium bromide absorbing solution, the corrosion suppressing effect of which is improved. The lithium bromide absorbing solution comprises 100–500 ppm of $LiNO_3$, 50–1000 ppm of BTA (benzotriazole), and LiOH. According to the U.S. patent, as a concentration of $LiNO_3$ contained in the absorbing solution, 350 ppm is better while a concentration of LiOH is not specified. This absorbing solution is improved on a corrosion suppressing effect to reduce an amount of corrosion (weight loss), and at the same time, the absorbing solution greatly suppresses occurrence of pitting corrosion which was apt to occur hitherto. The pitting corrosion suppression effect decreases as temperature of the absorbing solution rises. Therefore, for structural members subjected to a high temperature and in contact with the lithium bromide absorbing solution, such as the above-mentioned gas heating tubes, it is particularly desired to improve more the pitting corrosion suppression effect of the lithium bromide absorbing solution.

SUMMARY OF THE INVENTION

An object of the invention is to provide an absorption type refrigerator including a lithium bromide absorbing solution which is anti-corrosive to structural members of the refrigerator, and particularly, which can perfectly prevent pitting corrosion of the structural members made of carbon steel and subjected to a high temperature.

The above-mentioned object is achieved by a lithium bromide absorbing solution which includes 5–150 ppm by weight of $NO_3^-$ and 0.1–0.4 wt % of alkaline metal hydroxide and which is free from any triazole compounds.

DETAILED DESCRIPTION OF THE INVENTION

Figure 1:
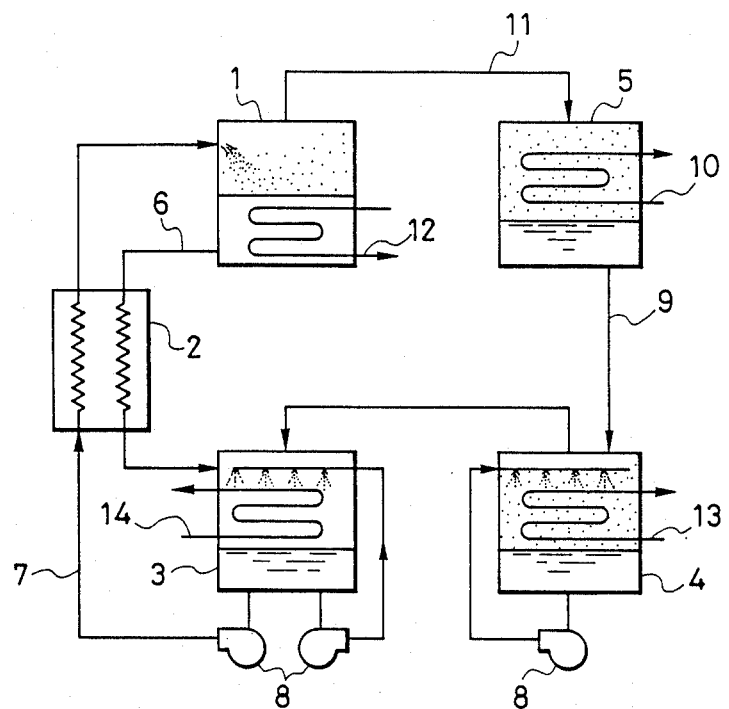
FIG. 1 is a schematic diagram showing a typical absorption type refrigerator.

The principle of an absorption type refrigerator is diagrammatically illustrated in FIG. 1.

In FIG. 1, an absorber 3 contains therein an aqueous absorbing solution. The absorbing solution absorbs a refrigerant, so that it is diluted to produce absorption heat, while being circulated by a pump 8. The absorption heat is transferred to a coolant tube 14 in which a coolant is filled. The diluted absorbing solution is transferred to a regenerator 1 by a pump 8 through an absorbing solution passage 7 with the pump 8. The regenerator 1 is provided with a heater 12 constituted of a steam tube, and regenerates the diluted absorbing solution by evaporating the refrigerant contained in the diluted absorbing solution to concentrate the diluted absorbing solution. The regenerated absorbing solution is returned into the absorber 3 through an absorbing solution passage 6. The diluted absorbing solution in the absorbing solution passage 7 and the regenerated or concentrated absorbing solution in the absorbing solution passage 6 are heat-exchanged by a heat-exchanger 2.

The evaporated refrigerant is transferred to a condenser 5 through a passage 11 In the condenser 5, the evaporated refrigerant is cooled by a cooling pipe 10 and condensed. The condensed refrigerant is transferred to an evaporator 4 through a passage 9. In the evaporator 4, the condensed refrigerant is circulated by a pump 8 and evaporated, so that fluid in a fluid pipe 13 such as water is cooled. The evaporated refrigerant is transferred to the absorber 1 to be absorbed therein.

Thus, the refrigerator employs various fluids which are hermetically enclosed and circulated.

Figure 2:
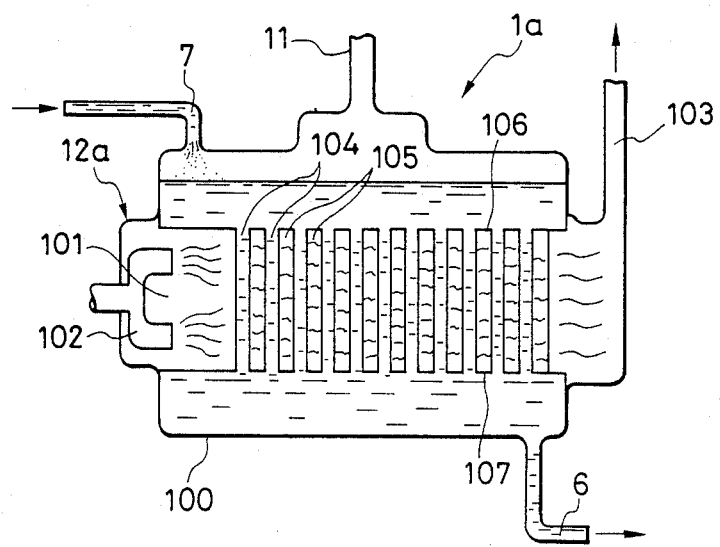
FIG. 2 is a sectional view of a regenerator of a absorption type refrigerator.

Although the above-mentioned regenerator employs the steam pipe as a heater, there is another type of regenerator, which is illustrated in FIG. 2.

In FIG. 2, a regenerator 1a is of type, wherein a combustion gas heater is used for a heater. The regenerator 1a has a container 100, containing therein a lithium bromide solution as an aqueous absorbing solution. The container 100 is provided with a combustion gas heater 12a. The heater 12a comprises upper and lower plates 106, 107 which have a plurality of holes and are secured to the container 100 with a space therebetween, a plurality of heating pipes 104 each of which is secured to the upper and lower plates 106, 107 so that the absorbing solution can flow from an upper region to a lower region through the heating pipe 104, a combustion chamber 101, a gas burner 102 disposed in the combustion chamber 101, and an exhaust gas duct 103. Gaseous fuel is combusted by the burner 102, and combustion gas passes through spaces 105 among the heating tubes 104 and is exhausted through the exhaust gas duct 103. Diluted absorbing solution entered the refrigerator 1a through the passage 7 is evaporated through heating of the diluted absorbing solution, evaporated refrigerant flows away through the passage 11 and concentrated absorbing solution flows out through the passage 6.

Although the steam pipe 12 is made of Cu or Cu-alloy, the upper and lower plates 106, 107, and the heating pipes 104 are made of carbon steel because the combustion gas has a high temperature so that they can be made of such material which is not so high in heat conductivity, such as carbon steel.

The above-mentioned hermetically circulating, absorption type refrigerator is operated under a pressure of less than the atmospheric pressure, and employs water as a refrigerant, and an aqueous concentrated lithium bromide solution as an absorbing solution.

The absorbing solution comprises lithium bromide as a main component so that it corrodes metal members made of carbon steel because the solution is weak acidic and contains $Br^-$.

In general, the higher the concentration of the absorbing solution becomes, the higher the refrigeration efficiency becomes. For example, a temperature and a lithium bromide concentration of the absorbing solution are 160° C. and 65% in the regenerator having the steam pipe, respectively, and about 40° C. and about 60%, respectively, in the absorber. In the regenerator equipped with the combustion gas heater as shown in FIG. 2, a surface temperature of the heating pipes reaches to about 180° C.

On the other hand, corrosive action of the lithium bromide solution becomes more intensive as the temperature and the concentration become high. Therefore, without adding any inhibitor as a suitable corrosion suppressing agent, carbon steel for structural members are intensively corroded.

In case of corrosion of carbon steel in contact with the absorbing solution, even if a conventional inhibitor such as 350-500 ppm of $LiNO_3$ is added so that weight loss of the carbon steel due to corrosion will be minimized, pitting corrosion can take place. Further, according to a concentration of lithium hydroxide added to the absorbing solution together with the inhibitor, a critical concentration of the lithium nitrate, which influences the pitting corrosion occurrence, changes. Further, as mentioned above, corrosive action of the lithium bromide solution on the carbon steel under a high temperature is very intensive, and under a high temperature, about 180° C. for instance, BTA added to the inhibitor to improve an anti-corrosive effect as disclosed in the U.S. patent is decomposed into gases. The present invention provides an absorption type refrigerator having an aqueous absorbing solution of lithium bromide and an aqueous absorbing solution of lithium bromide for the absorption type refrigerator, and the lithium bromide absorbing solution is stable and has excellent anti-corrosive effect on structural members of carbon steel subjected to a high temperature of about 180° C., for instance.

The lithium bromide absorbing solution includes $LiNO_3$ by 5-150 ppm by weight of $NO_3-$ and 0.1-0.4%, preferably 0.2-0.4% by weight of LiOH, without including any triazole compound such as benzotriazole. The solution can completely prevent pitting corrosion of carbon steel which is very dangerous. The stable, excellent anti-corrosive absorbing solution realizes an absorption type refrigerator of a high reliability.

The present invention will be further explained hereunder in detail.

The aqueous lithium bromide solution presents a weak acidity. Addition of lithium hydroxide to the solution converts the weak acidity into alkalinity, whereby iron-corrosion is suppressed. Namely, by maintaining pH of the absorbing solution in a range of 10 to 11, passivating action of iron is raised, and surface potential is converted from "lessnoble" to "noble", so that corrosion decreases. Further, in the alkaline absorbing solution of pH 10-11, solubility of corrosion of iron decreases. Therefore, a passive film (a kind of corrosion product of iron) formed on the iron surface is difficult to solve and stably exists, so that the passive films becomes a barrier of corrosive medium and protect iron corrosion, whereby the corrosion is suppressed.

In order to convert the pH of the absorbing solution of 65 wt % LiBr into 10 or more, the concentration of lithium hydroxide is necessary to be more than 0.1 wt %, preferably 0.2 wt % or more. In case the concentration of lithium hydroxide is more than 0.4 wt %, a corrosion suppressing effect decreases, and weight loss due to corrosion increases. This is because in case the alkaline concentration becomes too high, the passive film on the iron surface is broken, the surface potential is converted from noble to lessnoble, and the iron is apt to be corroded. The corrosion suppressing effect decreases as the temperature of the solution rises. The corrosion suppressing effect decreases remarkably at about 160° C. or more, so that too high concentration of lithium bromide is not desirable.

Nitrate in the lithium bromide solution has a function that formation of the passive film on the iron surface is promoted by oxidizing ability of $NO_3-$, and corrosion is suppressed thereby. The passive film is a dense film made of iron oxides which are corrosion products, and a stabler film has higher corrosion suppressing ability. $NO_3-$ aids in forming iron oxides by its oxidizing ability. In case the concentration of $No_3-$ is less than 5 ppm, the corrosion suppressing effect is remarkably small, so that it is not practical. As known well, the absorption type refrigerator is hermetically closed and operated under reduced pressure. Therefore, when an amount of iron corrosion is much, an amount of hydrogen gas following the iron corrosion increases, so that the pressure in the refrigerator is raised and normal operational cycle of the refrigerator can not be maintained. Therefore, although in case the concentration of $NO_3^-$ is less than 5 ppm, the state of corrosion of iron is general corrosion which does not include pitting corrosion, it is not desirable because of a large amount of corrosion or weight loss due to corrosion.

On the other hand, in case the concentration of $NO_3^-$ is more than 150 ppm, an amount of corrosion decreases according to an increase in the concentration, and the corrosion amount reaches minimum when the concentration increases to 350 to 400 ppm. When the concentration of $NO_3^-$ increases further, an amount of iron corrosion also tends to increase. In view of the corrosion state, however, in case of the concentration of $NO_3^-$ less than 150 ppm, the corrosion state is general corrosion of which corrosion control is easy. On the other hand, in case of the concentration of $NO_3^-$ being more than 150 ppm, the corrosion state changes to local corrosion such as pitting corrosion which is the most dangerous. Therefore, even if an average amount of the iron corrosion is small, there is a danger that holes are locally formed in the structural members. This reasons are as follows. As the concentration of $NO_3^-$ increases, the oxidizing ability of the lithium bromide solution increases, so that formation of the passive film on the iron surface is promoted and a strong film is formed. The passive film is partially broken by $Br^-$ in the solution, an active surface is exposed and corrosion progresses partially. Usually, $NO_3^-$ in the solution acts on the active iron surface to cause both correction action which forms a passive film again on the active surface and a breaking action of the passive film by $Br^-$. The two actions are balanced, whereby the corrosion is suppressed. In a range of 5-150 ppm of $NO_3^-$ concentration, the above-mentioned two actions favorably balance whereby the general corrosion takes place, on the other hand, in a range of more than 150 ppm of the $NO_3^-$ concentration, the balance is broken so that pitting corrosion takes place.

Further, the reason that the corrosion suppressing effect is remarkably lowered at a concentration of $NO_3^-$ more than 400 ppm is that cathode reactions followed by the iron corrosion take place as follows, a reduction reaction of $NO_3^-$ is promoted in addition to a hydrogen production reaction, so that the cathode reactions become active as a whole, whereby the corrosion is promoted.

$$2H + 2e \longrightarrow H_2 \quad (1)$$

$$NO_3^- + H_2O + 2e \longrightarrow NO_2^- + 2OH^- \quad (2)$$

$$NO_3^- + 3H^+ + 2e \longrightarrow HNO_2 + H_2O \quad (3)$$

Further, the lithium hydrogen and the $NO_3^-$ concentration of the nitrate are represented by weight % and in all the above cases, the concentration of the lithium bromide is fixed to be 65 wt %.

In usual, an absorption type refrigerator employs octyl alcohol which is added into the absorbing solution in order to raise heat conduction. In the absorbing solution according to the present invention, such octyl alcohol can be included The octyl alcohol does not influence the corrosion suppressing effect.

EXAMPLE 1

Figure 3:
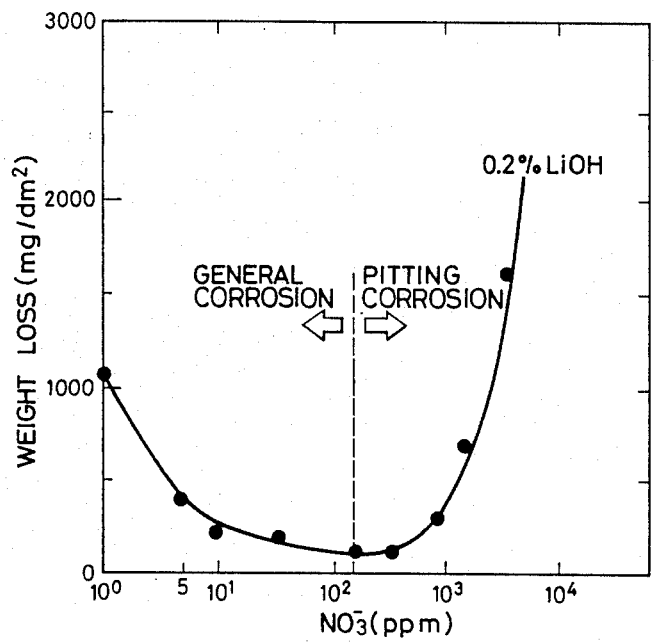
FIG. 3 is graphical illustration showing a relationship between weight loss due to corrosion of carbon steel and nitrate concentration.

Aqueous absorbing solutions consisting of 65 wt % of lithium bromide, 0.2 wt % of lithium hydroxide, lithium nitrate of which $NO_3^-$ concentration is changed in the range of 0-3000 ppm by weight, 5 ml/l n-octyl alcohol and the remaining of water were prepared, and subjected to a corrosion test at a temperature of 160° C. for 200 hours. An average corrosion amount, that is, an average weight loss of carbon steel in contact with the absorbing solution is shown in FIG. 3. With respect to $NO_3^-$ concentration dependency of the average weight loss, the minimum weight loss exists at the $NO_3^-$ concentration of 350 ppm. The weight loss increases rapidly at a $NO_3^-$ concentration more than 350 ppm. On the other hand, the weight loss is large at 0 ppm. Further, as shown in FIG. 3, pitting corrosion takes place at a $NO_3^-$ concentration more than 150 ppm. The weight loss in the range of 5 to 150 ppm of $NO_3^-$ concentration is slightly larger than at the $NO_3^-$ concentration of 350 ppm, however, in the former, there is a remarkable advantage that the corrosion form or state is general corrosion which is easy to control corrosion in the refrigerator. Observing the outer surface of the carbon steel after the corrosion test through photograph found clearly that the general corrosion took place at a $NO_3^-$ concentration of less than 150 ppm and the pitting corrosion took place at a concentration of $NO_3^-$ of at least 150 ppm. It is noted that $NO_3^-$ concentration of 50-150 ppm is more preferable in view of weight loss.

EXAMPLE 2

Figure 4:
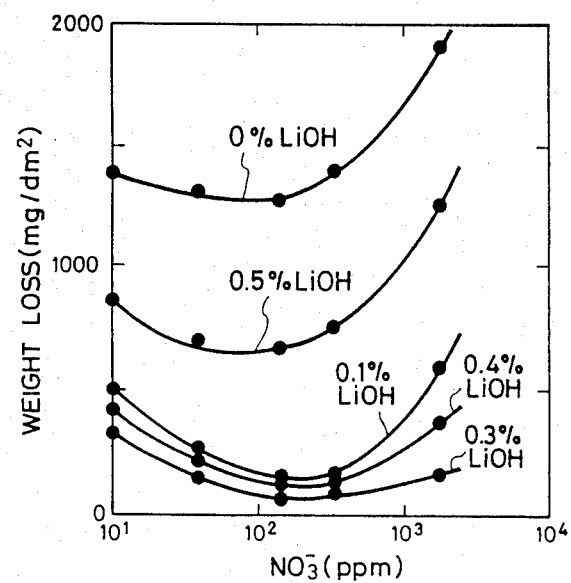
FIG. 4 is a graphical illustration of relationships among weight loss due to corrosion of carbon steel, nitrate concentration and each of various concentrations of lithium hydroxide.

Aqueous absorbing solutions was prepared by adding 0-0.5 wt % of lithium hydroxide, lithium nitrate the $NO_3^-$ concentration of which changed in a range of 0-3000 ppm by weight, and 5 ml/l of n-octyl alcohol into 65 wt % lithium bromide aqueous solution, and subjected to a corrosion test at a temperature of 160° C. for 200 hours. The results are shown in FIG. 4 An average corrosion amount was strongly influenced by concentrations of lithium hydroxide and $NO_3^-$, an average weight loss of carbon steel was small at 0.1-0.4 wt %, particularly, 0.2-0.4 wt % of lithium hydroxide, and at 5-150 ppm of $NO_3^-$ concentration and the solution exhibited excellent corrosion suppressing effect. However, as in the example 1, pitting corrosion took plate at 350 ppm of $No_3^-$ concentration, on the other hand at a $NO_3^-$ concentration less than 150 ppm, general corrosion took place.

EXAMPLE 3

Figure 5:
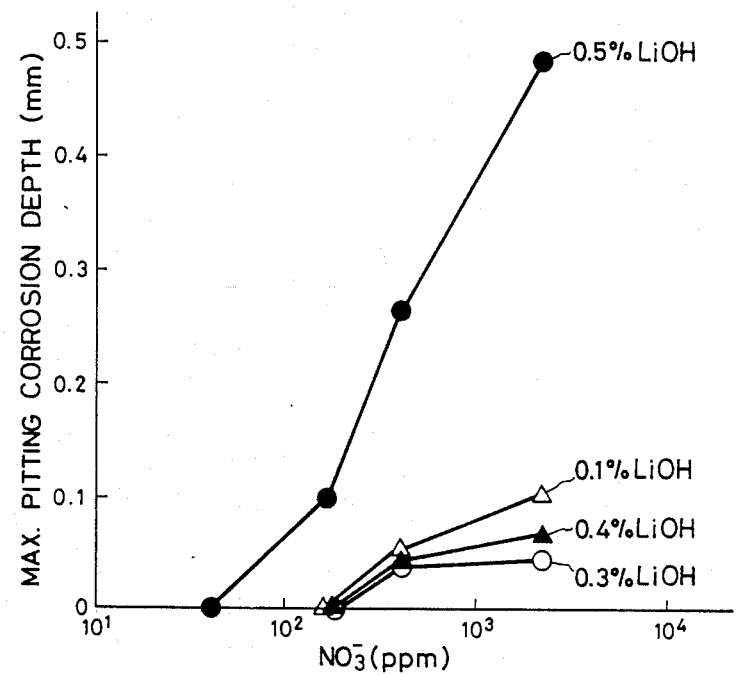
FIG. 5 is graphical illustration showing relationship among pitting corrosion depth, $NO_3^-$ concentration and LiOH concentration.

Aqueous absorbing solutions were prepared by adding 0.1-0.5 wt % of lithium hydroxide, lithium nitrate the $No_3^-$ concentration of which is changed in a range of 50-2000 ppm, and 5 ppm of n-octyl alcohol into a 65 wt % lithium bromide aqueous solution. The absorbing solutions were subjected to a test of carbon steel corrosion at 160° C. for 200 hours, and depth of pitting corrosion was examined. The results are shown in FIG. 5.

The pitting corrosion depends on concentrations of $No_3^-$ and lithium hydroxide, any pitting corrosion did not occur at the $NO_3^-$ concentration less than 150 ppm in case of the concentration of lithium hydroxide being 0.1-0.4 wt %.

EXAMPLE 4

An aqueous absorbing solution was prepared by adding 130 ppm of $LiNO_3$ and 0.2 wt % of LiOH into a 65 wt % LiBr aqueous solution. The solution was subjected to a test of carbon steel corrosion at a temperature 160° C. for 200 hours. The result is listed on a Table 1.

TABLE 1

|  | Inhibitor | Weight Loss (mg/dm$^2$) | Pitting Occurrence (numbers/dm$^2$) |
|---|---|---|---|
| Conventional LiBr absorbing solution | LiNO$_3$ 350–500 ppm | 480–670 | 24 |
| U.S. Pat. No. 4,311,024 | LiNO$_3$/BTA 350 ppm/500 ppm | 210 | 5 |
|  | LiNO$_3$/BTA 140 ppm/650 ppm | 195 | 5 |
| Present invention | LiNO$_3$ 130 ppm | 70 | 0.2 |

(BTA: benzotriazole)

In the Table 1, it is noted that the solution including 130 ppm LiNO$_3$ and 0.2 wt % LiOH is much more excellent in the pitting corrosion and weight loss due to corrosion than the prior arts.

EXAMPLE 5

The same aqueous absorbing solution as in example 4 was prepared and subjected to a corrosion test of carbon steel at a temperature of 200° C. for 200 hours. The result is shown in Table 2 as compared with the prior arts.

TABLE 2

|  | Inhibitor | Weight Loss (mg/dm$^2$) | Pitting Occurrence (numbers/dm$^2$) |
|---|---|---|---|
| Conventional LiBr absorbing solution | LiNO$_3$ 350–500 ppm | 520–710 | 51 |
| U.S. Pat. No. 4,311,024 | LiNO$_3$/BTA 350 ppm/500 ppm | 420 | 24 |
|  | LiNO$_3$/BTA 140 ppm/650 ppm | 405 | 21 |
| Present invention | LiNO$_3$ 130 ppm | 105 | 1.8 |

(BTA: benzotriazole)

As is shown in Table 2, it is noted that although the weight loss of carbon steel and pitting corrosion increase at a higher temperature than in Table 1, in the absorbing solution according to the present invention they are much less than in the prior arts.

What is claimed is:

1. In an absorption type refrigerator comprising an absorber containing therein an absorbing solution for absorbing a refrigerant to form a diluted absorbing solution and generate absorption heat, said absorbing solution comprising a lithium bromide aqueous solution containing an inhibitor, a regenerator provided with heating tubes for regenerating the diluted absorbing solution by heating the diluted absorbing solution to concentrate the absorbing solution through evaporation of the refrigerant, a condensor for condensing the evaporated refrigerant and an evaporator for evaporating the condensed refrigerant to cool a coolant and for supplying said absorber with an evaporated refrigerant, the improvement comprising an aqueous absorbing solution that is a 65 wt % lithium bromide aqueous solution and an inhibitor consisting of LiNO$_3$ of which the NO$_3$− concentration is in a range of 5–150 ppm by weight and 0.1–0.4% by weight of LiOH, based on the weight of the lithium bromide aqueous solution.

2. The absorption type refrigerator as defined in claim 1, wherein said heating tube is made of carbon steel and directly heated by a combustion gas to transfer heat thereof to said lithium bromide solution.

3. The absorption type refrigerator as defined in claim 1, wherein said absorbing solution contains octyl alcohol in an amount sufficient to raise the heat conduction of said absorbing solution.

4. In an absorption type refrigerator comprising an absorber containing therein an absorbing solution for absorbing a refrigerant to form a diluted absorbing solution and generate absorption heat, said absorbing solution comprising a lithium bromide aqueous solution containing an inhibitor, a regenerator provided with heating tubes for regenerating the diluted absorbing solution by heating the diluted absorbing solution to concentrate the absorbing solution through evaporation of the refrigerant, a condensor for condensing the evaporated refrigerant and an evaporator for evaporating the condensed refrigerant to cool a coolant and for supplying said absorber with an evaporated refrigerant, the improvement comprising an aqueous absorbing solution consisting essentially of a 65 wt % lithium bromide solution and an inhibitor consisting of LiNO$_3$ of which the NO$_3$− concentration is in a range of 5–150 ppm by weight and 0.2–0.4% by weight of LiOH, based on the weight of the lithium bromide aqueous solution.

5. The absorption refrigerator as defined in claim 4, wherein concentration of said NO$_3$− and LiOH are 50–150 ppm by weight, and 0.3% by weight, respectively.

6. An absorbing solution for an absorption type refrigerator, which comprises a 65 wt % lithium bromide aqueous solution and an inhibitor for reducing corrosion added thereto, said inhibitor consisting of LINO$_3$ of which the NO$_3$− concentration is 5–150 ppm by weight and 0.1–0.4% by weight of LiOH, based on the weight of the lithium bromide aqueous solution.

7. An absorbing solution as defined in claim 6, wherein octyl alcohol in an amount to raise heat conduction is further added to said lithium bromide aqueous solution.

8. An absorbing solution for an absorption type refrigerator, which consists of a 65 wt % lithium bromide aqueous solution and additives consisting essentially of LiNO$_3$ of which the NO$_3$− concentration is 5–150 ppm by weight and 0.2 to 0.4 wt % of LiOH, based on the weight of the lithium bromide aqueous solution, and octyl alcohol in an amount sufficient to raise heat conduction of said absorbing solution.

9. The absorption refrigerator as defined in claim 4, wherein said absorbing solution contains octyl alcohol.

* * * * *